Patented July 2, 1946

2,402,977

UNITED STATES PATENT OFFICE 2,402,977

REACTIVE SULPHIDE POLYMER AND PROCESS OF MAKING IT

Joseph C. Patrick, Morrisville, Pa., and Harry R. Ferguson, Trenton, N. J., assignors to Thiokol Corporation, Trenton, N. J., a corporation of Delaware No Drawing. Application January 24, 1944, Serial No. 519,546

10 Claims. (Cl. 260—79)

This invention relates to organic sulphide polymers.

The art of organic sulphur polymers, including those frequently referred to by the term "polysulphide polymers," has been considerably developed, as shown by the following patents issued to Joseph C. Patrick:

| Patent No. | Date of issue |
|---|---|
| 2,049,974 | Aug. 4, 1936 |
| 2,100,351 | Nov. 30, 1937 |
| 2,142,144 | Jan. 3, 1939 |
| 2,142,145 | Jan. 3, 1939 |
| 2,195,380 | Mar. 26, 1940 |
| 2,206,641 | July 2, 1940 |
| 2,206,642 | July 2, 1940 |
| 2,206,643 | July 2, 1940 |
| 2,216,044 | Sept. 24, 1940 |
| 2,221,650 | Nov. 12, 1940 |
| 2,235,621 | Mar. 18, 1941 |
| 2,255,228 | Sept. 9, 1941 |
| 2,278,127 | Mar. 31, 1942 |
| 2,278,128 | Mar. 31, 1942 |

It is an object of the present invention to produce improved polymers of this general type.

It is a further object of the present invention to produce such polymers, the plasticity, viscosity, or consistency of which can be controllably varied over wide limits, as, for example, from a consistency or viscosity corresponding to a readily pourable liquid to polymers requiring considerable pressure to cause deformation. It will be appreciated that the achievement of such a result greatly expands the field of usefulness of such polymers, particularly provided—as is true in the case of the present invention—that the resulting polymer can be cured after being poured, cast, or shaped to any desired form into an article having its ultimate properties fully developed by such curing. For example, it is a great advantage to have a polymer which can be cast, i. e., by pouring into any desired shape, which polymer, after being so cast or poured, is capable of self-cure to develop its ultimate desirable properties, including high tensile strength and excellent resistance to abrasion.

It will be understood that the usefulness of polymers of the character described, depends to a large extent upon the ease with which they can be mixed with various compounding ingredients and shaped into various forms while in the uncured condition, combined with the property of being capable of curing to develop their ultimate properties after that operation has been completed. Different applications call for different degrees of consistency, i. e., viscosity or plasticity, and it is of great advantage to be able to provide a manufacturer with a polymer having a viscosity or plasticity adapted to meet his particular needs. Such manufacturers may desire a liquid, uncured product which can be readily poured or cast and then subsequently cured. Other manufacturers may desire an uncured polymer having a higher viscosity or a solid consistency. According to the present invention, consistency or viscosity may, as above stated, be controllably varied over a wide range to suit the varied needs of a large variety of manufacturing operations.

It is a further object of the present invention to provide polymers, the consistency of which may be varied over the wide range stated without the use of any solvent. It is, of course, common practice in the art of synthetic resins, plastics, etc., to vary the consistency by the addition of solvents, but such addition is attended with the disadvantage that the presence of the solvents limits the usefulness of the product. In accordance with the present invention, no solvent is necessary in order to achieve the desired consistency of the polymeric product produced.

It is a further object of the invention to provide a solution of the long-standing problem of obtaining a polysulphide polymer which, after being compressed to a desired degree, will substantially or fully recover its original shape after the distorting force is released, in other words, a polysulphide polymer free from the disadvantage of cold flow. It is possible to produce polymers free from this disadvantage by means of a reaction between an alkaline polysulphide and an organic compound containing at least three substituents attached to one or more carbon atoms, which substituents are split off by reaction with the polysulphide. Such polymers are free from the disadvantage of cold flow, in that they possess what is termed "cross linkage," or a three-dimensional space lattice. However, in general, such polymers possess the disadvantage that they are not readily manipulated, shaped, or formed. In accordance with the present invention, a polymer is provided which, in addition to having the wide range of consistency above mentioned—and, therefore, the adaptability to numerous shaping and forming operations—possesses, when cured, cross linkages, or space lattice structure, and freedom from cold flow.

It is a further object of the invention to obtain a polymer which possesses not only the advantages above set forth, but also a high degree of reactivity—so high, in fact, that the polymers may be cured at ordinary temperatures by means of curing agents incorporated with the polymer after its initial preparation and prior to the curing step.

In accordance with the present invention, an organic compound of the class or genus herein described is reacted with a polymer-forming reagent. The nature of the reagent and its general reaction mechanism with the class of organic compounds dealt with, will be hereinafter described. It may be stated at the outset that this class is a broad one. It comprises, in general, organic compounds having at least two replaceable substituents which may be attached to the same carbon atom or to different carbon atoms, respectively. In its broadest scope, this class includes organic compounds having at least one carbon atom and at least two carbon-attached substituents split off by reaction of said organic compound with said reagent. Within this broad class, the invention includes the use of bifunctional organic compounds having only two substituents joined, respectively, to each of two different carbon atoms, which substituents are split off by reaction with said reagent. These two carbon atoms may be adjacent or separated by and joined to intervening structure of diverse character, including intervening structure containing ether linkage. The invention also includes the reaction with said polymer-forming agent of multifunctional organic compounds, i. e., those containing three or more carbon-attached substituents split off by reaction with said reagent.

The replaceable substituents, as clearly set forth in the above-identified Patrick patents, are substituents split off in the reaction with the polymer-forming reagent which includes a polysulphide, e. g., a disulphide, trisulphide, tetrasulphide, pentasulphide, or hexasulphide, or mixtures thereof. The substituents may be halogen atoms or any other negative radicals capable of being split off by said reaction. As stated in numerous patents issued to Joseph C. Patrick, these negative radicals are illustrated by halogens, nitrate, sulphate, acid sulphate, carbonate, acetate, propionate, acid phosphate, tartrate and acid tartrate and similarly acting radicals. If the organic compound contains only two replaceable substituents, there will, in general, be only linear chain growth to produce a linear polymer. If, however, the organic compound has three substituents connected to the same carbon atom or different carbon atoms, then there will, in general, occur not only linear chain growth, but also three-dimensional growth, giving rise to cross linkage or space lattice structure. In support of this generic phraseology, the present invention includes reactions, with the reagent hereinafter described, of a large number of specifically different organic compounds illustrated by those shown in the above-mentioned Patrick patents, e. g., those shown in U. S. Patents 2,142,144, of November 30, 1937, and 2,216,044, of September 24, 1940, and multifunctional compounds exemplified by the following:

$$CHCl_3$$
$$Cl_2CH\ CH_2Cl$$
$$ClCH_2CHCl\ CH_2Cl$$
$$Cl\ CH_2CHCl\ CH_2O\ CH_2\ CHClCH_2Cl$$
$$ClCH_2CH_2CHCl\ CH_2Cl$$

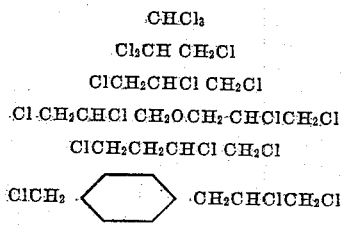

It will be noted that some of these compounds contain only two substituents which are split off by reaction with said reagent, and other compounds contain three or more of such substituents. In so far as the mechanics of the reaction is concerned, it is to be emphasized that it is the functionality of the organic compound, rather than the specific structure thereof, which accounts for the polymer formation—and by functionality is, of course, meant the substituents which react with the polymer-forming reagent.

Mixtures of two or more of any of the above compounds, or any other compounds within the genus described, may be reacted with said reagent to produce copolymers. Of particular interest is the reaction between the polymer-forming reagent and a mixture containing both a bifunctional and a multifunctional compound. The bifunctional compound, which does not produce cross linkage, acts as a spacer of the cross linkages produced by the multifunctional compound. Since the specific properties of such a copolymer depend to a considerable extent on the frequency or density of the cross linkage structure, a great variety of properties may be obtained by varying the molar ratio of the multifunctional to the bifunctional compound. In accordance with this invention, that molar ratio may be varied from about 1 to 1000 to about 800 to 1.

The polymer-forming reagent employed in the present invention is a mixture of alkaline polysulphide and alkaline hydrosulphide. To illustrate the polysulphides that may be used, there may be mentioned the alkaline disulphides, trisulphides, tetrasulphides, pentasulphides, and hexasulphides, the disulphide being particularly useful. Among the alkaline hydrosulphides are sodium, potassium, cesium, lithium, rubidium, ammonium, etc., hydrosulphides. The reaction which occurs when this reagent is employed is a complicated one. The polysulphide is a chain former, that is, its tendency is to produce chain growth, linear or cross linkage, or both, depending upon the functionality of the organic compound. The hydrosulphide has a different function, or rather functions. One of these tends to introduce SH, or mercapto radicals, by reaction of the hydrosulphide with the functional or replaceable groups. Another effect or function of the hydrosulphide is to cause splitting or cleavage of the chains which the polysulphide tends to form. When the two reagents are mixed together, constituting the single reagent of the present invention, competing and different reactions occur. The nature and effect of such competing reactions depend upon the proportion between the polysulphide and hydrosulphide. It may be said that one of the components, that is, the polysulphide component of the reagent, is an oxidizer or chain former, and the other, that is, the hydrosulphide component, a reducer or chain splitter. The nature and outcome of the reaction may be interpreted in terms of the theory of probability. However, for the purposes of the present invention, it may be pointed out that the use of the reagent and the variation of the proportions of the components thereof, accomplish a number of very important results, including (A) the introduction of SH groups into the polymer which confers great reactivity thereon and makes possible the production of the polymer which may be cured even at ordinary temperatures, and (B) limitation of the average molecular weight or size of the molecular aggregates within a wide range and, therefore, control of the viscosity, plasticity, or consistency of the polymer over a wide range. It will be appreciated that the combination of these two results is of the greatest importance. It is possible to produce many polymers, the consistency of which can be varied over a considerable range, but not possessing the property of being readily cured. When, however, the polymer is obtained, the consistency of which may be varied, without the use of solvents, over a very wide range and which at the same time possesses the property of being cured to its ultimate condition even at ordinary temperatures, this combination of properties produces a polymer having extremely wide ranges of usefulness—particularly when, if desired, that polymer in its ultimate cured condition possesses sufficient cross linkage to be substantially free from cold flow. As to the proportion between polysulphide and hydrosulphide, in general, the distribution—speaking in terms of molar proportions, varies from 9 mols of polysulphide to 1 mol of hydrosulphide, to 9 mols of hydrosulphide to 1 of polysulphide. In general, the greater the proportion of polysulphide, the higher is the viscosity and the lower the plasticity of the polymer prior to curing, and the higher the proportion of hydrosulphide to polysulphide, the lower is the viscosity and the greater the plasticity prior to curing.

The following and specific examples will serve to illustrate the principles which have been described above and which will be further defined in the appended claims.

Example 1

Reaction of the polymer-forming reagent with an organic compound having only two substituents attached, respectively, to carbon atoms separated by intervening structure:

In a three-necked flask of 5 liters capacity—fitted with a reflux condenser, means for mechanical agitation, and termometer—are placed 2000 cc. of a 2 molar solution of sodium disulphide ($Na_2S_2$) and 500 cc. of a 2 molar solution of sodium hydrosulphide (NaSH)—the molar ratio, therefore, being 4 mols of sodium disulphide to 1 mol of sodium hydrosulphide. To this mixture of sulphides are added 25 grams of crystallized magnesium chloride ($MgCl_2.6H_2O$) dissolved in about 50 cc. of water. The sulphide mixture is heated with agitation to a temperature of 160° F. and has added to it, drop by drop, 4 mols of dichloro diethyl formal, the formal being added at such a rate that about one hour is required for its total addition. The reaction being exothermic, the temperature will rise and should be controlled in such a manner that it does not go much above 180° F.

After all the formal has been added to the reaction mix and the temperature has ceased to rise spontaneously, heat is applied so that the temperature can be maintained at about 180° F. for about one hour. The agitation is then stopped, and the latex-like dispersion formed as a result of the reaction is allowed to settle out of the liquid. This supernatant liquid is then withdrawn, and the dispersion is freed from water-soluble impurities by rapidly agitating with water, settling, and withdrawing the wash liquid until this process is complete.

The washed latex is then treated with dilute acid until the pH of the supernatant liquid reaches about 6, that is to say, until a slight degree of acidity has been established. The latex is again washed, as above described, by agitation with water and allowed to settle out until the soluble magnesium salts have been removed. As a result of this acid treatment, a phenomenon, analogous to coagulating a rubber latex, takes place and a coagulum is produced having the consistency of a thick syrupy material.

Example 2

Varying the consistency by increasing the ratio of hydrosulphide to polysulphide:

Proceed as in Example 1, except that 2.5 mols of sodium disulphide and 2.5 mols of sodium hydrosulphide are substituted for the mixture of sulphides used in Example 1. The resulting coagulated polymer in this case is a material having the consistency of a thin, syrupy material which is capable of flowing or pouring.

Example 3

Application of the invention to a multifunctional compound:

Proceed as in Example 2, except that 2 mols of 1,2,3,trichloropropane are substituted for the 4 mols of formal. The consistency of the resulting polymer, when coagulated, is that of a rather soft, sticky, but unpourable, mass resembling a very soft rubber or chicle. By way of contrast, it may be stated that if the same reaction were carried out using a reagent consisting wholly of disulphide in the same molar ratio to the trichloropropane, the product would have been a rather hard, tough, and untractable polymer.

Example 4

Application of the invention to make a copolymer by applying the polymer-forming reagent to a mixture of a multifunctional compound and a bifunctional compound:

In a flask equipped as in Example 1, are placed 2250 cc. of 2 molar solution of $Na_2S_2$ (4.5 mols) and 250 cc. of 2 molar solution of NaSH (0.5 mols), the ratio of polysulphide to hydrosulphide, therefore, being 9:1. After the addition of the $MgCl_2$, as described in Example 1, and heating of the polysulphide mix to 160° F., there are added to the reaction mix, a mixture of 3 mols of triglycol dichloride and 0.5 mol 1,2,3,trichloropropane, and the reaction is otherwise carried on as in Example 1. The properties of the resulting coagulum are those of a tough, partially-vulcanized rubber.

Example 5

Proceed as in Example 4, except that the sulphide mix in this case consists of 2250 cc. of a 2 molar solution of NaSH and 250 cc. of 2 molar solution of $Na_2S_2$. The molar ratio of sodium hydrosulphide being, therefore, 9:1. As a result of this change of ratio, the consistency of the resulting polymer is that of a very soft, syruplike material capable of being poured and of flowing under its own weight.

At this point it may be stated that the effect of a multifunctional compound in usefully modifying the properties of a polymer made by using a mixture of a multifunctional and bifunctional compound, is apparent when the ratio of multifunctional to bifunctional compound is as low as 1 to 1000 (molar ratio). It is preferred that the ratio should not exceed about 800 to 200 (molar ratio).

Notwithstanding the variation in the consistencies and structures of the polymers of this invention, including those produced in accordance with the specific examples above given, said polymers are, in general, capable of being cured, and the curing reactivity is so great that the curing may be accomplished in the cold. The linear polymers are subject to cold flow, but, in general, the cross-linked polymers and copolymers, that is, those obtained from compounds having a functionality of 3 or more, possess the property of recovery from compression, that is, cold flow resistance.

The ability of the polymeric products of the reaction of the functional compounds with the polymer-forming reagent to cure, is due to the reactivity of the mercapto or mercaptide groups. Due to this fact, curing or condensing agents, in general, which condense with or cause the union of mercapto or mercaptide groups, may be used. For example, condensing agents, in general, may be employed because their reaction with the mercapto terminals consists in the removal of hydrogen and the union of the sulphur atoms of the mercapto group into the continuous linkages. It is not, therefore, the specific character of the curing or condensing agent which accomplishes the condensation generally, but the ability of that agent to react with mercapto groups. Therefore, oxidizing agents, in general, may be employed, such as air, oxygen, peroxides, per salts, polysulphide, and many oxygen-containing salts, such as the chromates, manganates, permanganates, molybdates, etc. However, the condensing agents are not limited to what are generally known as oxidizing agents, because, as previously stated, condensing agents in general may be used which will react with mercapto groups. Therefore, aldehydes in general may be used, since, as known, aldehydes react with mercapto groups to form mercaptal condensation products. Of course, the common commercially-available aldehydes are, naturally, preferred for economic reasons, such as, formaldehyde, acetaldehyde, and furfuraldehyde. Instead of aldehyde, ketones in general may be employed as condensing agents. As a matter of fact, aldehydes and ketones act, in a sense, as oxidizing agents in relation to mercapto groups and, therefore, may be said to constitute a class of oxidizing agents—water being eliminated as a byproduct of this process.

Specific examples of curing in accordance with the principle above described are as follows:

Example 6

The polymer produced as in Example 5 is mixed with compounding ingredients as follows:

|  | Parts by weight |
|---|---|
| Polymer | 100 |
| Lead peroxide | 5 |
| Reinforcing carbon black | 40 |
| Stearic acid | 1 |

The above components are mixed on a conventional rubber mixing mill, and placed in a steel mold and cured at a temperature of 310° F. for 15 minutes.

This product, when submitted to a standard ASTM test or "cold flow," shows from 70–80% recovery, and is in marked contrast to a product produced from a linear polymer.

Instead of the lead peroxide used in the above Example 6, curing agents in general, as above described, may be substituted.

Example 7

The soft, syrupy polymer of Example 5 is compounded as follows:

|  | Parts by weight |
|---|---|
| Polymer | 100 |
| Zinc peroxide | 30 |

The ingredients are mixed in any suitable manner, such as in a commercial liquid or paint mixer, and the resulting semi-liquid material is poured into any suitable mold and heated to a temperature of about 158° F. to 170° F. for from two to three hours, after which, when the mold is opened, a perfect cast of the mold is obtained in the form of a resilient rubber.

The curing procedure specifically described in connection with Examples 4 and 5 may also be applied to any of the polymers produced in accordance with this invention, whether cross-linked or linear.

Example 8

Curing the polymer without the application of heat:

|  | Parts by weight |
|---|---|
| Polymer of Example 5 | 100 |
| PbO$_2$ | 25 |

These ingredients are thoroughly mixed and then cast into any desired shape. Curing takes place without the application of external heat. The curing reaction is exothermic, and considerable heat is evolved.

What is claimed is:

1. Process which comprises reacting a polymer-forming reagent, comprising a mixture of an alkaline polysulphide and an alkaline hydrosulphide with an organic compound containing at least one carbon atom and at least two carbon-attached negative substituents split off by reaction of said organic compound with said reagent, the molar proportion of hydrosulphide to polysulphide in said reagent being from about 9 to 1 to about 1 to 9.

2. Process which comprises reacting a polymer-forming reagent, comprising a mixture of an alkaline polysulphide and an alkaline hydrosulphide with a bifunctional organic compound having only two negative substituents joined, respectively, to each of two different carbon atoms, which substituents are split off by reaction of said compound with said reagent, the molar proportion of hydrosulphide to polysulphide in said reagent being from about 9 to 1 to about 1 to 9.

3. Process which comprises reacting a polymer-forming reagent, comprising a mixture of an alkaline polysulphide and an alkaline hydrosulphide with a bifunctional organic compound having only two negative substituents joined, respectively, to each of two different carbon atoms, which compound with said reagent, said carbon atoms being joined to and separated by intervening structure, the molar proportion of hydrosulphide to polysulphide in said reagent being between about 9 to 1 and 1 to 9.

4. Process which comprises reacting a polymer-forming reagent, comprising a mixture of an alkaline polysulphide and an alkaline hydrosulphide with a bifunctional organic compound having only two negative stituents joined, respectively, to each of two different carbon atoms, which substituents are split off by reaction of said compound with said reagent, said carbon atoms being joined to and separated by intervening structure containing ether linkage, the molar proportion of hydrosulphide to polysulphide in said reagent being between about 9 to 1 and 1 to 9.

5. Process which comprises reacting a polymer-forming reagent, comprising a mixture of an alkaline polysulphide and an alkaline hydrosulphide with a multifunctional organic compound having at least three carbon-attached negative substituents split off by reaction of said organic compound with said reagent, the molar proportion of hydrosulphide to polysulphide in said reagent being from about 9 to 1 to about 1 to 9.

6. Process which comprises reacting a polymer-forming reagent, comprising a mixture of an alkaline polysulphide and an alkaline hydrosulphide with a multifunctional organic compound having at least two carbon atoms and at least three carbon-attached negative substituents split off by reaction of said organic compound with said reagent, the molar proportion of hydrosulphide to polysulphide in said reagent being from about 9 to 1 to about 1 to 9.

7. Process which comprises reacting a polymer-forming reagent, comprising a mixture of an alkaline polysulphide and an alkaline hydrosulphide with a mixture of a bifunctional organic compound and a multifunctional organic compound, the bifunctional organic compound having only two negative substituents split off by reaction of said compound with said reagent, which substituents are joined, respectively, to each of two different carbon atoms, the multifunctional organic compound having at least three carbon-attached negative substituents split off by reaction with said reagent, the molar proportion of multifunctional to bifunctional compound varying from about 1 to 1000 to about 800 to 200 and the molar proportion of hydrosulphide to polysulphide in said reagent varying from about 9 to 1 to about 1 to 9.

8. Process which comprises reacting a polymer-forming reagent, comprising a mixture of an alkaline polysulphide and an alkaline hydrosulphide with dichlordiethyl formal, the molar proportion of hydrosulphide to polysulphide in said reagent varying from about 9 to 1 to 1 to 9.

9. Process which comprises reacting a polymer-forming reagent, comprising a mixture of an alkaline polysulphide and an alkaline hydrosulphide with 1,2,3 trichloropropane, the molar proportion of hydrosulphide to polysulphide in said reagent varying from about 9 to 1 to 1 to 9.

10. Process which comprises reacting a polymer-forming reagent, comprising a mixture of an alkaline polysulphide and an alkaline hydrosulphide with a mixture of dichlordiethyl formal and 1,2,3,trichloropropane, the molar proportion of trichloropropane to dichlordiethyl formal varying from about 1 to 1000 to 800 to 200 and the molar proportion of hydrosulphide to polysulphide in said reagent varying from about 9 to 1 to 1 to 9.

JOSEPH C. PATRICK.
HARRY R. FERGUSON.